United States Patent
Kirsch et al.

(10) Patent No.: US 11,364,917 B2
(45) Date of Patent: Jun. 21, 2022

(54) VEHICLE HAVING A CAMERA FOR DETECTING A BODY PART OF A USER AND METHOD FOR THE OPERATION OF THE VEHICLE

(71) Applicant: HELLA GMBH & CO. KGAA, Lippstadt (DE)

(72) Inventors: Oliver Kirsch, Wuppertal (DE); Tobias Heine, Bamberg (DE); Joachim Olk, Lippstadt (DE); Oliver Klenke, Teltow (DE); Frank Schliep, Soest (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 184 days.

(21) Appl. No.: 16/901,849

(22) Filed: Jun. 15, 2020

(65) Prior Publication Data

US 2020/0307609 A1 Oct. 1, 2020

Related U.S. Application Data

(63) Continuation of application No. PCT/EP2018/083298, filed on Dec. 3, 2018.

(30) Foreign Application Priority Data

Dec. 13, 2017 (DE) ...................... 10 2017 129 787.1

(51) Int. Cl.
*B60W 40/08* (2012.01)
*B60Q 1/00* (2006.01)
(Continued)

(52) U.S. Cl.
CPC ........... *B60W 40/08* (2013.01); *B60Q 1/0023* (2013.01); *B60R 1/04* (2013.01); *B60R 1/06* (2013.01);
(Continued)

(58) Field of Classification Search
CPC ........... B60Q 1/0023; B60R 1/04; B60R 1/06; B60R 1/12; B60R 11/04;
(Continued)

(56) References Cited

U.S. PATENT DOCUMENTS 6,252,978 B1   6/2001 Grantz
6,323,761 B1 * 11/2001 Son ...................... B60R 25/305
                                                        340/426.35
(Continued)

FOREIGN PATENT DOCUMENTS

DE          44 14 216 C1    4/1995
DE          100 46 309 C1   10/2001
(Continued)

*Primary Examiner* — Babar Sarwar
(74) *Attorney, Agent, or Firm* — Muncy, Geissler, Olds & Lowe, P.C.

(57) ABSTRACT

The present invention relates to a vehicle, which comprises a vehicle component for performing a vehicle function, at least one camera and a controller, the vehicle component being drivable with the aid of the controller, depending on the evaluation of the visual detection of a body part of a user with the aid of the camera, for the purpose of performing the vehicle function. To implement a vehicle function to be enabled with the aid of a camera for visually detecting a body part of a user of a vehicle with little complexity, it is proposed that the camera and the controller are designed and configured to carry out a further vehicle function, and the camera is drivable with the aid of the controller, depending on a triggering signal present at the controller for performing the visual detection of the body part of the user.

35 Claims, 1 Drawing Sheet

(51) Int. Cl.

| | | |
|---|---|---|
| *B60R 1/04* | (2006.01) | |
| *B60R 1/06* | (2006.01) | |
| *B60R 1/12* | (2006.01) | |
| *B60W 30/00* | (2006.01) | |
| *B60W 50/14* | (2020.01) | |
| *G05D 1/00* | (2006.01) | |
| *H04N 5/225* | (2006.01) | |
| *H04N 5/232* | (2006.01) | |
| *G06V 10/143* | (2022.01) | |
| *G06V 20/59* | (2022.01) | |
| *G06V 40/10* | (2022.01) | |
| *G06V 40/20* | (2022.01) | |

(52) U.S. Cl.
CPC .............. *B60R 1/12* (2013.01); *B60W 30/00* (2013.01); *B60W 50/14* (2013.01); *G05D 1/0011* (2013.01); *G06V 10/143* (2022.01); *G06V 20/597* (2022.01); *G06V 40/10* (2022.01); *G06V 40/20* (2022.01); *H04N 5/2256* (2013.01); *H04N 5/23238* (2013.01); *B60R 2001/1253* (2013.01); *B60W 2420/42* (2013.01); *B60W 2540/221* (2020.02)

(58) Field of Classification Search
CPC ..... B60R 2001/1253; B60R 2011/0092; B60R 2300/101; B60R 25/252; B60R 25/305; B60W 2420/42; B60W 2540/221; B60W 30/00; B60W 40/08; B60W 50/14; G05D 1/0011; H04N 5/2256; H04N 5/23238; G06V 10/143; G06V 20/597; G06V 40/10; G06V 40/20
See application file for complete search history.

(56) References Cited

U.S. PATENT DOCUMENTS

| | | | |
|---|---|---|---|
| 7,109,470 B2 | 9/2006 | Köhler | |
| 8,831,970 B2* | 9/2014 | Weik, III | G06Q 20/3276 705/28 |
| 9,117,107 B2* | 8/2015 | Klimov | G06V 40/166 |
| 9,191,627 B1* | 11/2015 | Reid | H04N 5/247 |
| 9,205,806 B2 | 12/2015 | Günter | |
| 9,305,412 B2* | 4/2016 | Winkelman | G07C 9/00571 |
| 9,610,893 B2* | 4/2017 | Lopez-Hinojosa | H04W 4/90 |
| 9,816,308 B2* | 11/2017 | Myers | E05B 81/08 |
| 9,920,564 B2* | 3/2018 | Ebert | E05F 15/73 |
| 10,137,857 B1* | 11/2018 | Siddiqui | B60R 25/255 |
| 10,241,509 B1* | 3/2019 | Fields | G01C 21/3407 |
| 10,328,855 B2* | 6/2019 | Lopez-Hinojosa | G08G 1/096716 |
| 10,356,372 B2* | 7/2019 | Shen | H04N 5/23241 |
| 10,482,226 B1* | 11/2019 | Konrardy | G06F 16/2455 |
| 10,678,849 B1* | 6/2020 | Ouimet | G06F 16/9038 |
| 10,723,312 B1* | 7/2020 | Potter | G08B 21/02 |
| 10,744,967 B2* | 8/2020 | Lee | B60W 30/06 |
| 10,748,419 B1* | 8/2020 | Fields | H04N 7/183 |
| 10,774,575 B2* | 9/2020 | Spangler | B60N 2/0228 |
| 10,824,415 B1* | 11/2020 | Fields | B60W 50/045 |
| 10,940,790 B1* | 3/2021 | Mazuir | F21V 14/04 |
| 11,227,480 B2* | 1/2022 | Abe | G06V 20/64 |
| 11,242,051 B1* | 2/2022 | Konrardy | B60W 10/04 |
| 2014/0204211 A1* | 7/2014 | Gussen | B60R 25/25 348/148 |
| 2016/0281410 A1 | 9/2016 | Schanz et al. | |
| 2019/0011914 A1* | 1/2019 | Park | B60W 40/08 |
| 2019/0011993 A1 | 1/2019 | Ette et al. | |
| 2019/0031145 A1* | 1/2019 | Trelin | B60W 40/08 |
| 2019/0066424 A1* | 2/2019 | Hassani | B60R 25/252 |
| 2019/0108407 A1* | 4/2019 | Okayasu | G06F 16/5866 |
| 2019/0126935 A1* | 5/2019 | Phillips | G07C 5/085 |
| 2019/0276044 A1* | 9/2019 | Bae | B60W 50/08 |

FOREIGN PATENT DOCUMENTS

| | | |
|---|---|---|
| DE | 10 2004 020 255 A1 | 9/2005 |
| DE | 10 2011 111 600 A1 | 2/2013 |
| DE | 10 2013 010 018 B3 | 12/2014 |
| DE | 10 2014 011 806 A1 | 2/2016 |
| DE | 10 2016 204 860 A1 | 9/2016 |
| DE | 10 2016 100 064 A1 | 7/2017 |
| DE | 10 2016 109 940 A1 | 11/2017 |
| EP | 2 500 218 A1 | 9/2012 |
| EP | 2 757 001 A1 | 7/2014 |
| EP | 3 025 908 A1 | 6/2016 |

\* cited by examiner

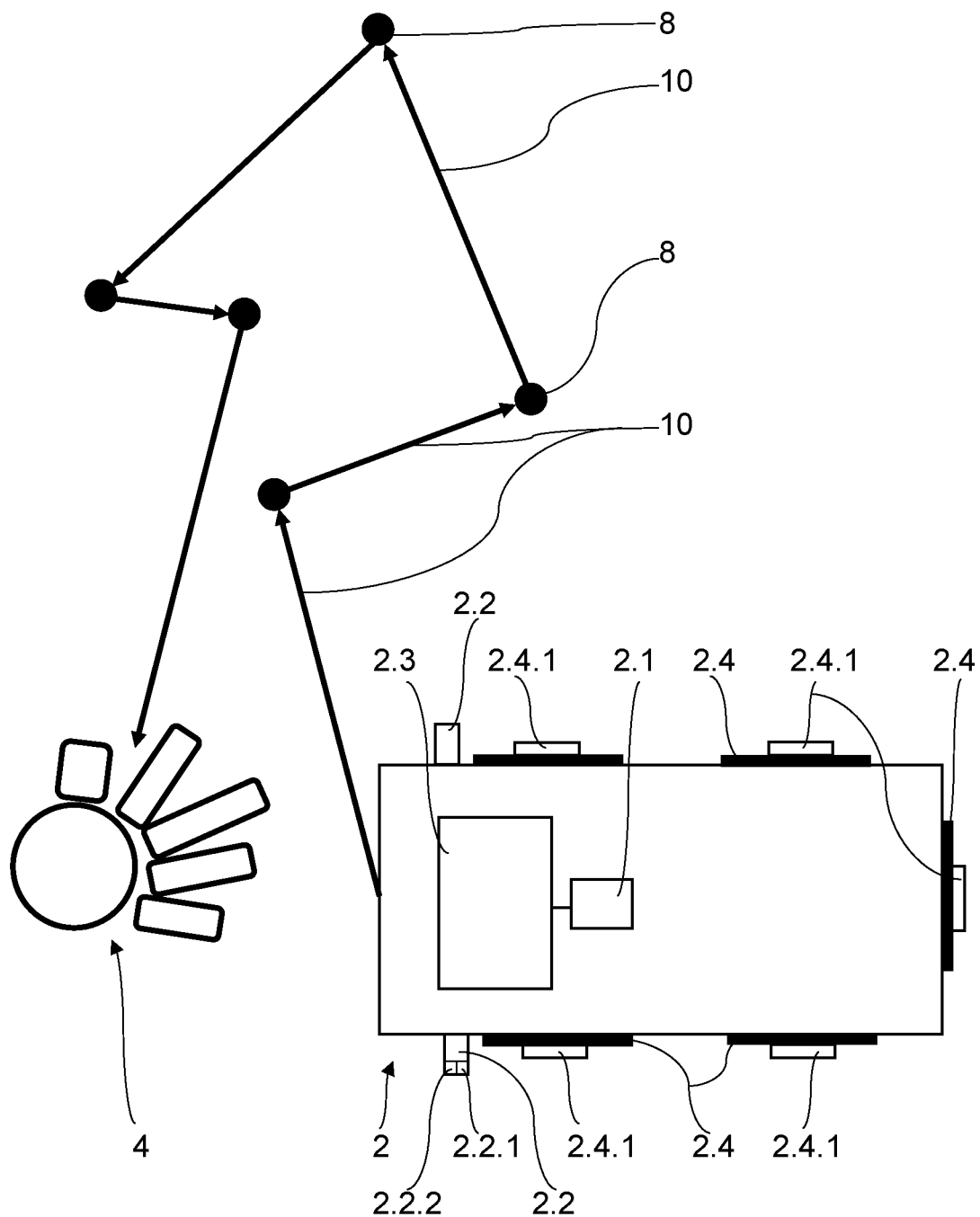

VEHICLE HAVING A CAMERA FOR DETECTING A BODY PART OF A USER AND METHOD FOR THE OPERATION OF THE VEHICLE

This nonprovisional application is a continuation of International Application No. PCT/EP2018/083298, which was filed on Dec. 3, 2018, and which claims priority to German Patent Application No. 10 2017 129 787.1, which was filed in Germany on Dec. 13, 2017, and which are both herein incorporated by reference.

BACKGROUND OF THE INVENTION

Field of the Invention

The present invention relates to a vehicle having a camera for detecting a body part of a user, and a method for operating the vehicle.

Description of the Background Art

Vehicles and methods for their operation are already known from the prior art in numerous design variants.

For example, a motor vehicle and a method for providing a keyless access control to this motor vehicle are known from DE 10 2014 011 806 A1, a detection device detecting at least one object next to the motor vehicle and transmitting a connection signal to a switching device only if the object is detected, and the switching device electrically connects an access control device to a power source upon receiving the connecting signal, the access control device detects a palm vein pattern in a user standing next to the motor vehicle with the aid of a camera, and if the detected palm vein pattern matches a stored, authorized palm vein pattern, sends an unlocking signal to a lock device, and upon receiving the unlocking signal, the lock device unlocks at least one vehicle door and/or vehicle hatch.

SUMMARY OF THE INVENTION

It is therefore an object of the present invention to implement, with little complexity, a vehicle function to be enabled with the aid of a camera for the visual detection of a body part of a user of a vehicle.

In an exemplary embodiment, a vehicle is provided in which a camera and a controller are designed and configured to carry out a further vehicle function, and the camera is drivable with the aid of the controller depending on a triggering signal present at the controller for the purpose of performing the visual detection of the body part of the user, and by a method for operating a vehicle whereby the camera and the controller are designed and configured to carry out a further vehicle function, and the controller drives the camera, depending on a triggering signal present at the controller, for the purpose of performing the visual detection of the body part of the user. The body part of the user may be any body part of a user suitable for a visual detection with the aid of a camera and for the particular application. For example, the body part may be a hand of the user.

A vehicle function to be enabled with the aid of a camera for the visual detection of a body part of a user of a vehicle may be implemented with little complexity. Due to the use of the at least one camera and the controller for a further vehicle function, the structural and circuitry complexity in implementing a vehicle function to be enabled with the aid of a camera for the visual detection of a body part of a user of a vehicle is reduced. Accordingly, a cost-effective and space-saving implementation of a vehicle function of this type is facilitated. For example, it is conceivable that the further vehicle function is available for being performed or is automatically carried out in a parked state of the vehicle equipped therewith.

Depending on the presence of the triggering signal, the controller automatically switches the camera, for example from the performance of the further vehicle function to the visual detection of a body part of the user, so that the vehicle component is drivable with the aid of the controller for performing the vehicle function, depending on the evaluation of the output signals corresponding to the visual detection of the body part with the aid of the camera. This may similarly apply, for example, to an automatic switching of the camera from the visual detection of the body part of the user for the purpose of automatically enabling a vehicle function to the performance of the further vehicle function of the vehicle of the user. However, it is also possible that the further vehicle function is alternatively or additionally available for being performed or is automatically carried out in a parked state of the vehicle equipped therewith. Accordingly, the above explanations apply similarly to the case last mentioned.

The same applies to the method according to the invention for operating a vehicle.

The camera is designed and configured to visually detect at least one biometric feature of the body part, and the controller is designed and configured to evaluate output signals of the camera corresponding to this biometric feature of the body part. An identification of a special user of the vehicle is facilitated hereby in a high-quality manner. The identification of a special user of the vehicle by means of biometry, for example a biometric measurement of a hand of the special user, ensures this high quality of the identification and thus prevents an undesirable performance of the vehicle function, for example the undesirable unlocking of a central lock system of the vehicle by unauthorized persons. The texture of the skin, the course of the lifelines or even scars and wrinkles are conceivable as biometric features, for example, of a body part designed as a hand of a user. However, this listing is only an example and is not conclusive.

This applies similarly to a particularly advantageous refinement of the method according to the invention, whereby at least one biometric feature of the body part is visually detected and evaluated with the aid of the camera and the controller.

In principle, the triggering signal is freely selectable within broad, suitable parameters, depending on type and generation. The triggering signal may be advantageously generated depending on a proximity sensor for detecting an approach of the user to the camera. For example, an energy-saving operating of the vehicle is made possible in this manner. The proximity sensor is also freely selectable within broad, suitable parameters according to type, functionality, material, dimensioning, arrangement and quantity. Those skilled in the art will select the suitable proximity sensor depending on the requirements in the individual case. It is particularly advantageous if the proximity sensor is also usable for at least one other vehicle function. For example, the other vehicle function may be a parking aid or the like.

The same applies to an advantageous refinement of the method according to the invention, whereby the triggering signal is generated depending on a proximity sensor for detecting an approach of the user to the camera.

Another particularly advantageous refinement of the vehicle according to the invention provides that at least one of the at least one camera is designed and configured to visually detect the body part of the user in two separate wavelength ranges, or one of at least two cameras is designed and configured to visually detect the body part of the user in a first wavelength range, and the other of the at least two cameras is designed and configured to visually detect the body part of the user in a second wavelength range, which is different from the first wavelength range, and the controller is designed and configured to evaluate output signals of the at least one camera corresponding thereto. The quality of the visual detection of the body part of the user of the vehicle is improved hereby. Moreover, a redundancy is established, so that, for example, a malfunction in the visual detection of the body part in the one wavelength range may be at least partially compensated for with the aid of a proper functioning of the visual detection of the body part in the other wavelength range.

This applies similarly to another particularly advantageous refinement of the method according to the invention, whereby the visual detection of the body part of the user takes place in two wavelength ranges, which are different from each other, and the controller evaluates output signals corresponding thereto.

In principle, the two wavelength ranges for the visual detection of the body part of the user of the vehicle are freely selectable within broad, suitable parameters depending on the type, particular range size and according to the position of the particular wavelength range. For example, the selection may take place depending on the at least one camera already available to the vehicle for the further vehicle function. In the aforementioned embodiment of the vehicle according to the invention, it is advantageously that at least one of the at least one camera is designed and configured to visually detect the body part of the user a first wavelength range corresponding to visible light and in a second wavelength range corresponding to infrared radiation, or one of at least two cameras is designed and configured to visually detect the body part of the user in a first wavelength range corresponding to visible light, and the other of the at least two cameras is designed and configured to visually detect the body part of the user in a second wavelength range corresponding to infrared radiation, and the controller is designed and configured to evaluate output signals of the at least one camera corresponding thereto. Cameras of this type are technologically advanced and are available for selection in a wide variety of types. Accordingly, a wide range of applications is made possible at simultaneously low cost.

The same applies to an advantageous refinement of the aforementioned embodiment of the method according to the invention, whereby the visual detection of the body part of the user takes place in a first wavelength range corresponding to visible light and in a second wavelength range corresponding to infrared radiation, and the controller evaluates output signals corresponding thereto.

Another advantageous refinement of the vehicle according to the invention provides that a camera lighting apparatus of the vehicle is assigned to at least one of the at least one camera, the wavelength range of the light emitted by the camera lighting apparatus being designed to be matched to the wavelength range of the camera corresponding thereto, and the camera lighting apparatus being drivable with the aid of the controller for emitting light, depending on an operating state of the camera. The quality of the visual detection of the body part of the user of the vehicle is further improved hereby. This applies, in particular, in the case of poor visibility, such as at night. It is particularly advantageous if the camera lighting apparatus is also usable for additional vehicle functions. For example, the camera lighting apparatus may be used in the parked mode of the vehicle for visually guiding the user to more easily locate the vehicle, provided that the light emitted thereby is in the wavelength range of visible light. It would also be conceivable to use the camera lighting apparatus to support the user when leaving the vehicle.

This applies similarly to one advantageous refinement of the vehicle according to the invention, whereby a camera lighting apparatus of the vehicle is assigned to at least one of the at least one camera, the wavelength range of the light emitted by the camera lighting apparatus being designed to be matched to the wavelength range of the camera corresponding thereto, and the controller drives camera lighting apparatus, depending on an operating state of the camera for emitting light.

A particularly advantageous refinement of the vehicle according to the invention provides that the vehicle includes a positioning assistance apparatus for positioning the body part of the user for the purpose of its visual detection with the aid of at least one of the at least one camera, the positioning assistance apparatus being drivable, depending on an operating state of the camera, with the aid of the controller for outputting a positioning assistance signal which is optically and/or acoustically perceivable by the user. In this way, a proper orientation of the body part of the user for the visual detection of the body part is promoted with the aid of the camera. The quality of the visual detection of the body part is correspondingly further increased, while the time required for this purpose is reduced. Moreover, a positioning assistance signal of this type simultaneously shows the user that the camera is ready to visually detect the body part. With the aid of the positioning assistance signal, the user is thus prompted to position the body part according to the positioning assistance signal for the visual detection thereof with the aid of the camera. However, it is also conceivable that the vehicle includes an apparatus separate from the positioning assistance apparatus for notifying the user of the operating state of the camera for visually detecting the body part, this apparatus being drivable, depending on an operating state of the camera, with the aid of the controller for outputting an operating signal which is optically and/or acoustically perceivable by the user. An operating signal of this type, a hand or the like, could be projected, for example, onto the vehicle and/or onto a lane of the vehicle. The apparatus for notifying the user would be correspondingly designed in this case as a projection apparatus.

The same applies to one particularly advantageous refinement of the method according to the invention, whereby the vehicle includes a positioning assistance apparatus for positioning the body part of the user for the purpose of its visual detection with the aid of at least one of the at least one camera, the controller driving the positioning assistance apparatus, depending on an operating state of the camera, for outputting a positioning assistance signal which is optically and/or acoustically perceivable by the user.

Another advantageous refinement of the vehicle according to the invention provides that the vehicle includes an acknowledgment apparatus for acknowledging the visual detection of the body part of the user with the aid of at least one of the at least one camera, the acknowledgment apparatus being drivable, depending on a proper visual detection of the body part of the user, with the aid of the controller for outputting an acknowledgment signal which is optically and/or acoustically perceivable by the user. This makes it possible to notify the user of the vehicle of the proper functioning and the visual detection of the body part in a quality necessary for the evaluation.

The same applies to an advantageous refinement of the method according to the invention, whereby the vehicle includes an acknowledgment apparatus for acknowledging the visual detection of the body part of the user with the aid of at least one of the at least one camera, the controller driving the acknowledgment apparatus, depending on a proper visual detection of the body part of the user, with the aid of the camera for outputting an acknowledgment signal which is optically and/or acoustically perceivable by the user.

Another advantageous refinement of the vehicle according to the invention provides that at least one of the at least one camera is disposed on an external rear-view mirror and/or on an internal rear-view mirror of the vehicle. In this way, the camera is easily reachable by the user for the purpose of visual detection of the body part of the user. Moreover, cameras for further vehicle functions are often already provided in the external rear-view mirrors and in the internal rear-view mirror, so that a use of cameras of this type is made possible for the visual detection of the body part. Moreover, suitable installation space already exists in external rear-view mirrors of this type and in internal rear-view mirrors of this type for the visual detection of the body type of the user of the vehicle equipped therewith. A combination of a camera for an outer area of the vehicle, for example as part of at least one of the external rear-view mirrors, with a camera for an inner area of the vehicle, for example as part of the internal rear-view mirror, would also be conceivable.

In principle, the at least one camera is freely selectable within broad, suitable parameters, according to the type, functionality, dimensioning, material, arrangement and quantity. However, one particularly advantageous refinement of the vehicle according to the invention provides that one of the at least one camera is preferably designed as a camera having a wide-angle lens, preferably as a camera having a fisheye lens, particularly preferably as a camera having a field of vision greater than or equal to 180°, and the controller is designed and configured to evaluate output signals of the at least one camera corresponding thereto. A larger detection range of the camera is made possible with the aid of a wide-angle lens. This applies, in particular, to fisheye lenses, in particular to camera lenses having a field of vision greater than or equal to 180°. Accordingly, cameras having lenses of this type may be used not only to visually detect the body part of the user but also for a large number of different vehicle functions, for example a visual detection of the surroundings of the vehicle over a wide area.

Another advantageous refinement of the vehicle according to the invention provides that one of the at least one camera is designed and configured as a camera for monitoring the user state, and the controller is designed and configured to evaluate output signals of the at least one camera corresponding thereto. As another vehicle function, for example, the degree of attention on the part of the user, for example of the vehicle driver of the vehicle, may be monitored in a manner known to those skilled in the art with the aid of the user state monitoring function. However, this is purely by way of example. The user state monitoring function may also be used for the vehicle function as an alternative or in addition to the additional vehicle function. The concept, "user state," refers to the psychological and physiological condition of the user of the vehicle and thus his ability to control the vehicle in a manner safe for traffic. For example, fatigue, the influence of drugs or alcohol or another psychological or physical disorder could result in the user no longer being able to drive the vehicle in traffic. Correspondingly, the performance of the vehicle function, for example a starting of the drive motor of the vehicle, could be blocked, based on the user state monitoring, for example the monitoring of the eyelid movement of the eyes.

A particularly advantageous refinement of the vehicle according to the invention, provides that at least one of the at least one biometric feature of the body part is designed as a biometric feature for biodetection. This ensures, for example, that an undesirable performance of the vehicle function by unauthorized persons is not possible using two-dimensional images fed into the vehicle.

This applies similarly to one particularly advantageous refinement of the method according to the invention, whereby at least one of the at least one biometric feature of the body part is designed as a biometric feature for biodetection.

One advantageous refinement of the aforementioned embodiment of the vehicle according to the invention provides that at least one of the at least one biometric feature for biodetection is designed as a human pulse. The at least one biometric feature of the body part for biodetection is particularly effectively designed hereby.

The same applies to one advantageous refinement of the aforementioned embodiment of the method according to the invention, whereby at least one of the at least one biometric feature for biodetection is designed as a human pulse.

An advantageous refinement of the last-mentioned embodiment of the vehicle according to the invention, provides that light may be emitted in a wavelength range corresponding to infrared radiation with the aid of the camera lighting apparatus for the purpose of detecting the human pulse. In this way, the detection of the human pulse is implemented in a technically simple manner.

This applies similarly to one advantageous refinement of the last-mentioned embodiment of the method according to the invention, whereby light is emitted in a wavelength range corresponding to infrared radiation with the aid of the camera lighting apparatus for the purpose of detecting the human pulse.

Another advantageous refinement of the vehicle according to the invention, provides that at least one of the at least one biometric feature is designed as a three-dimensional contour of an outer or an inner surface of the body part, light having a predefined pattern being projectable onto the body part with the aid of the camera lighting apparatus. As an alternative or in addition to the detection of the human pulse for biodetection, a protection against an unauthorized performance of the vehicle function with the aid of a two-dimensional image fed into the vehicle is technically easily implemented hereby.

The same applies to one advantageous refinement of the method according to the invention, whereby at least one of the at least one biometric feature is designed as a three-dimensional contour of an outer or an inner surface of the body part, light having a predefined pattern being projected onto the body part with the aid of the camera lighting apparatus.

Another advantageous refinement of the vehicle according to the invention provides that the camera and the controller are designed and configured to generate and/or store a shared signature in the camera and in the controller, the shared signature being able to be entered into a recorded image with the aid of the camera, and this recorded image with the shared signature being identifiable as an image recorded by the camera with the aid of the controller, based on the shared signature. The security against an unauthorized performance of the vehicle function is further improved in this manner. The shared signature may be, for example, a time stamp synchronized between the camera and the controller or at least one light flash synchronized between the camera and the controller. For example, a time relationship between the visual detection of the body part with the aid of the camera and the evaluation of the output signals of the camera may be checked in the controller with the aid of the synchronized time stamp or the synchronized light flash.

This applies similarly to one advantageous refinement of the method according to the invention, whereby a shared signature is generated and/or stored in the camera and in the controller, and the camera enters the shared signature into an image recorded with the aid of the camera, this recorded image with the shared signature being identified as an image recorded by the camera, based on the shared signature.

Another advantageous refinement of the vehicle according to the invention provides that the camera is designed and configured for visual detection, and the controller is designed and configured to evaluate a movement of the body part. The security against an unauthorized performance of the vehicle function is additionally improved hereby in a particularly technically simple manner.

The same applies to one advantageous refinement of the method according to the invention, whereby a movement of the body part is visually detected with the aid of the camera and evaluated with the aid of the controller.

Another particularly advantageous refinement of the vehicle according to the invention provides that the camera may be automatically transferred from a first camera orientation optimized for carrying out the further vehicle function to a second camera orientation optimized for performing the vehicle function with the aid of a camera drive apparatus, depending on the triggering signal. This makes it possible to optimally orient the camera for carrying out the further vehicle function, on the one hand, and for optimally performing the vehicle function, on the other hand. Quality losses due to a compromise in the orientation of the camera are effectively prevented thereby.

This applies similarly to another particularly advantageous refinement of the method according to the invention, whereby the camera is automatically transferred from a first camera orientation optimized for carrying out the further vehicle function to a second camera orientation optimized for performing the vehicle function with the aid of a camera drive apparatus, depending on the triggering signal.

An advantageous refinement of the aforementioned embodiment of the vehicle according to the invention provides that the first camera orientation and the second camera orientation are predefined and stored in the controller for driving the camera drive apparatus. The automatic camera orientation is very easily technically implemented hereby.

The same applies to one advantageous refinement of the aforementioned embodiment of the method according to the invention, whereby the first camera orientation and the second camera orientation are predefined and stored in the controller for driving the camera drive apparatus.

An alternative advantageous refinement in relation to the last-mentioned embodiment of the vehicle according to the invention provides that the first camera orientation is predefined and stored in the controller for driving the camera drive apparatus, and the second camera orientation is automatically settable with the aid of the camera drive apparatus for performing the vehicle function, depending on the images of the body part detected with the aid of the camera. In this way, the second camera orientation is provided with a variable design for performing the vehicle function, so that the quality is improved during the visual detection of the body part. The camera is thus automatically transferred to the second camera orientation for performing the vehicle function, based on the images detected with the aid of the camera, for example until a lens of the camera, i.e. the main beam of a lens of the camera, is positioned essentially perpendicularly to a palm of the hand. The body part, i.e., for example, the palm of the hand, may be detected afterwards in time in good quality with the aid of the camera.

This applies similarly to an alternative advantageous refinement with respect to the last-mentioned embodiment of the vehicle according to the invention, whereby the first camera orientation is predefined and stored in the controller for driving the camera drive apparatus, and the second camera orientation is automatically set with the aid of the camera drive apparatus for performing the vehicle function, depending on the images of the body part detected with the aid of the camera.

Moreover, one advantageous refinement of the vehicle according to the invention provides that the vehicle component is additionally drivable with the aid of a portable remote control for performing the vehicle function, the remote control being automatically transferable back and forth between an activation state, in which the vehicle component is drivable with the aid of the remote control, and a deactivation state, in which the vehicle component is not drivable with the aid of the remote control, depending on a driving of the vehicle component with the aid of the camera. This makes it possible to operate the vehicle component for performing the vehicle function, in principle, with the aid of a remote control, which is known per se, on the one hand, and depending on the visual detection of the body part, on the other hand. According to this refinement, it is possible, for example, to leave the remote control in the vehicle during an excursion to a lake for swimming. A vehicle component of the vehicle designed as a central locking system could be locked with the aid of the visual detection upon leaving the vehicle. In addition, the remote control remaining in the vehicle could be automatically transferred to its deactivation state. The vehicle could thus not be operated with the aid of the remote control and therefor not be either opened or started. When the user returns to the vehicle from the lake, he may unlock the central locking system again with the aid of the visual detection and simultaneously transfer the remote control into its activation state. Accordingly, the vehicle could then be locked, unlocked and/or started in the usual manner with the aid of the remote control.

The same applies to an advantageous refinement of the method according to the invention, whereby the vehicle component is additionally drivable with the aid of a portable remote control for performing the vehicle function, the remote control being automatically transferred back and forth between an activation state, in which the vehicle component is drivable with the aid of the remote control, and a deactivation state, in which the vehicle component is not drivable with the aid of the remote control, depending on a driving of the vehicle component with the aid of the camera.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, are not limitive of the present invention, and wherein the sole FIGURE shows an exemplary embodiment of a vehicle according to the invention in partial representation.

DETAILED DESCRIPTION

An exemplary embodiment of a vehicle 2 according to the invention is illustrated in the FIGURE. Vehicle 2 is designed as a motor vehicle 2, namely as a passenger car 2. However, the invention is not limited thereto. Instead, the term, "vehicle," is to be broadly interpreted and covers all types of vehicles, not only land vehicles.

Vehicle 2 comprises a vehicle component 2.1 for performing a vehicle function, at least one camera 2.2.1 built into an external rear-view mirror 2.2 of vehicle 2 for visually detecting a body part 4 of a user of vehicle 2, for example a vehicle driver of vehicle 2, and a controller 2.3 for driving camera 2.2.1 for the purpose of evaluating output signals of camera 2.2.1 and for the purpose of driving vehicle component 2.1, vehicle component 2.1 and camera 2.2.1 being connected to controller 2.3 in a signal-transmitting manner, and vehicle component 2.1 being drivable with the aid of controller 2.3 for performing the vehicle function, depending on the evaluation of the output signals corresponding to the visual detection of body part 4, with the aid of camera 2.2.1. Body part 4 of the user is, for example, left hand 4 of the user. However, other body parts of the user are also possible according to the invention for a biometric evaluation in controller 2.3.

Vehicle component 2.1 is designed as an access system 2.1, with the aid of which an access to vehicle 2 is facilitated in the manner known to those skilled in the art in an unlocking state of access system 2.1 and is prevented in a locking state of access system 2.1. In an unlocking state of access system 2.1, each of the total of five doors 2.4 of vehicle 2 may be opened with the aid of a door handle 2.4.1. Camera 2.2.1 is built into left external rear-view mirror 2.2 of vehicle 2 and is designed as a camera 2.2.1 having a fisheye lens, which has a field of vision of 180°. The fisheye lens is designed in the manner known to those skilled in the art. The size of a detection range of camera 2.2.1 is correspondingly 180°. Controller 2.3 is further connected in a signal-transmitting manner to proximity sensors built into door handles 2.4.1 of doors 2.4 for the purpose of detecting an approach of the user to camera 2.2.1. The proximity sensors are designed as capacitive sensors. The term, "door," is to be broadly interpreted and, in the present exemplary embodiment, covers driver's door 2.4, passenger door 2.4 as well as the two rear doors 2.4 and hatch 2.4.

Camera 2.2.1 is designed and configured to visually detect at least one biometric feature of body part 4, and controller 2.3 is designed and configured to evaluate output signals corresponding to this biometric feature of body part 4. An identification of a special user of vehicle 2 is facilitated hereby in a high-quality manner. The identification of a special user of vehicle 2 by means of biometry, for example a biometric measurement of hand 4 of the special user, ensures this high quality of the identification and thus prevents an undesirable performance of the vehicle function, for example the undesirable unlocking of access system 2.1 of vehicle 2 by unauthorized persons. The texture of the skin, the course of the lifelines or even scars and wrinkles are conceivable as biometric features, for example, of hand 4 of the user. However, this listing is only an example and is not conclusive.

In the present exemplary embodiment, at least one of the at least one biometric feature of body part 4 is designed as a biometric feature for biodetection, namely as a human pulse.

Camera 2.2.1 and controller 2.3 are designed and configured to carry out a further vehicle function. In addition, camera 2.2.1 is drivable with the aid of controller 2.3 depending on a triggering signal present at controller 2.3 for the purpose of performing the visual detection of body part 4 of the user. Depending on, the detection of an approach of the user to camera 2.2.1 with the aid of one of the proximity sensors, the triggering signal is present at controller 2.3, and controller 2.3 drives camera 2.2.1 for the visual detection of body part 4 of the user. In the present exemplary embodiment, the further vehicle function is a surroundings detection, also referred to as surround view. Accordingly, camera 2.2.1 is designed and configured as a surroundings detection camera 2.2.1, also referred to as a surround view camera, with the aid of which at least one part of surroundings of vehicle 2 is visually detectable. The surroundings of vehicle 2 are not illustrated in greater detail. This image of at least one part of the surroundings of vehicle 2 may then be merged to form a complete image of the surroundings of vehicle 2 in the manner known to those skilled in the art, for example with the aid of further surroundings detection cameras of the vehicle. The further surroundings detection cameras could be installed, for example, in the other external rear-view mirror 2.2 on the right side of vehicle 2, and elsewhere.

In the present exemplary embodiment, camera 2.2.1 s designed and configured to visually detect body part 4 of the user in two wavelength ranges which are different from each other, and controller 2.3. is designed and configured to evaluate output signals of camera 2.2.1 corresponding thereto. Specifically, camera 2.2.1 is designed and configured to visually detect body part 4 of the user in a first wavelength range corresponding to visible light and in a second wavelength range corresponding to infrared radiation, namely near infrared radiation, and the controller is designed and configured to evaluate output signals of camera 2.2.1 corresponding thereto. The quality of the visual detection of body part 4 of the user, and thus the quality of the evaluation of the output signals of camera 2.2.1 in controller 2.3, is improved hereby.

Vehicle 2 includes additional assemblies to further increase the quality of the visual detection with the aid of camera 2.2.1 as well the quality of the evaluation of its output signals in controller 2.3.

Vehicle 2 includes a camera lighting apparatus 2.2.2 built into left external rear-view mirror 2.2, which is assigned to camera 2.2.1, the wavelength range of the light emitted by camera lighting apparatus 2.2.2 being designed to be matched to the wavelength range of camera 2.2.1, and camera lighting apparatus 2.2.2 being drivable for emitting light depending on an operating state of camera 2.2.1 with the aid of controller 2.3. In the present exemplary embodiment, camera lighting apparatus 2.2.2 comprises both a light source for emitting electromagnetic radiation in the wavelength range of visible light and a light source for emitting electromagnetic radiation in the near infrared range. Camera lighting apparatus 2.2.2 is further designed and configured to illuminate the surroundings of vehicle 2 in the area of left external rear-view mirror 2.2 with the aid of the light source for emitting electromagnetic radiation in the wavelength range of visible light, namely when the user leaves vehicle 2, and when the user approaches vehicle 2, which is further explained below.

Light in a wavelength range corresponding to infrared radiation may be emitted with the aid of camera lighting apparatus 2.2.2 for the purpose of detecting the human pulse.

In addition, camera lighting device 2.2.2 is simultaneously designed and configured as a positioning assistance apparatus 2.2.2 for positioning body part 4 of the user for the purpose of its visual detection with the aid of camera 2.2.1, positioning assistance device 2.2.2 being drivable depending on an operating state of camera 2.2.1 with the aid of controller 2.3 for outputting a positioning assistance signal which may be optically perceived by the user.

Camera lighting device 2.2.2 is also designed and configured as an acknowledgment apparatus 2.2.2 for acknowledging the visual detection of body part 4 of the user with the aid of camera 2.2.1, acknowledgment device 2.2.2 being drivable depending on a proper visual detection of body part 4 of the user with the aid of controller 2.3 for outputting an acknowledgment signal which may be optically perceived by the user.

The vehicle according to the invention and the method according to the invention are explained in greater detail below according to the present exemplary embodiment, based on the FIGURE.

The user, for example the vehicle driver, leaves vehicle 2. In the present exemplary embodiment, vehicle 2 is automatically locked when driver's door 2.4 is closed the user moves away. Access system 2.1 of vehicle 2 correspondingly locks all five doors 2.4 of vehicle 2. If there is insufficient brightness, it may be provided that camera lighting apparatus 2.2.2 supports the driver in getting out of and leaving vehicle 2 in the manner already explained above. A path that the user takes is symbolized by dots 8 and arrows 10 in the FIGURE. Dots 8 symbolize certain positions of the user on this path, while arrows 10 each represent the direction of movement of the user on this path.

The user returns to vehicle 2 and reaches the position indicated symbolically in the FIGURE with the aid of left hand 4 of the user. In the interest of clarity, this position is illustrated in the FIGURE at a slight distance from vehicle 2. For practical purposes, however, the approach to vehicle 2 takes place as follows:

The user reaches vehicle 2 and grips door handle 2.4.1 of driver's door 2.4 to open driver's door 2.4. This is detected with the aid of the proximity switch built into door handle 2.4.1 of driver's door 2.4. for detecting an approach of the user to camera 2.2.1 and transmitted as the triggering signal to controller 2.3. The triggering signal is thus present at controller 2.3, and controller 2.3 drives camera 2.2.1 to visually detect left hand 4 of the user. For this purpose, camera 2.2.1 is transferred from a switched-off state to an operating state with the aid of controller 2.3.

In order for the user to correctly position his left hand 4 in the detection range of camera 2.2.1, controller 2.3 first drives camera lighting apparatus 2.2.2 designed as a positioning assistance apparatus for positioning body part 4 of the user for the purpose of its visual detection with the aid of camera 2.2.1 in such a way that the light source of camera lighting apparatus 2.2.2 is switched on to emit electromagnetic radiation in the wavelength range of visible light and thereby illuminate the detection range of camera 2.2.1 for the user in the surroundings of vehicle 2 with the aid of an optically perceivable positioning assistance signal. For example, the emitted light designed as a positioning assistance signal may be a continuous light with the color white. In this way, the quality of the visual detection of left hand 4 of the user and thus the quality of the evaluation of output signals of camera 2.2.1 corresponding thereto, which are forwarded to controller 2.3 for evaluation, would be simultaneously increased. At the same time, the positioning assistance signal signals the operating state of camera 2.2.1 to the user; the user is thus simultaneously prompted by the positioning assistance signal to position his left hand 4 according to the positioning assistance signal.

The user positions his left hand 4 in the detection range of camera 2.2.1 according to the positioning assistance signal, and camera 2.2.1 visually detects left hand 4 of the user. The output signals corresponding to the image are transmitted by camera 2.2.1 to controller 2.3 for the purpose of evaluation.

In order for the user to be notified that his left hand 4 has been properly visually detected with the aid of camera 2.2.1, i.e. in a sufficient quality for an evaluation in controller 2.3, controller 2.3 drives camera illumination apparatus 2.2.2 designed as an acknowledgment apparatus for acknowledging the visual detection of body part 4 of the user with the aid of camera 2.2.1 in such a way that controller 2.3 drives camera lighting apparatus 2.2.2 depending on a proper visual detection of body part 4 of the user with the aid of camera 2.2.1 in such a way that the light source of camera lighting apparatus 2.2.2 is switched on to emit electromagnetic radiation in the wavelength range of visible light in a manner predefined and stored in controller 2.3, to thereby notify the user of the proper visual detection of his left hand 4 by means of an acknowledgment signal visually perceptible to the user. The acknowledgment signal may be, for example, a predefined flashing signal stored in controller 2.3. However, in the case of a camera lighting apparatus 2.2.2 designed and configured to emit colored light, it is conceivable that the latter is driven in such a way that visible light of a certain color, for example the color green, is emitted. Correspondingly, a visible light of a deviating color, for example the color red, could be emitted in the case of an incorrect visual detection of body part 4 of the user.

The output signals of camera 2.2.1 are evaluated in controller 2.3 in a manner known to those skilled in the art. For example, the output signals corresponding to the image are compared with data previously stored in controller 2.3, which corresponds to a user authorized to access vehicle 2. If the output signals of camera 2.2.1 present at controller 2.3 match the data of a user authorized to access vehicle 2 in a predefined manner, controller 2.3 drives access system 2.1 in such a way that all five doors 2.4 of vehicle 2 are unlocked. For example, it may be provided that a 100% match of the output signals with the data stored for a user does not have to take place. In this way, it is possible to compensate for certain tolerances in the vehicle according to the invention and the method according to the invention.

In the present exemplary embodiment, the output signals of camera 2.2.1 corresponding to the image and the previously stored data of controller 2.3 are at least one biometric feature of hand 4 of the user. A secure identification of the user is ensured with the aid of the biometric measurement of hand 4 of the user, and thus an undesirable access of an unauthorized person to the vehicle is effectively prevented. As already explained above, the at least one biometric feature of hand 4 may be, for example, the texture of the skin, the course of the lifelines or even scars and wrinkles.

Due to the design of at least one biometric feature as a biometric feature for biodetection, an undesirable access of unauthorized persons to vehicle 2 is effectively prevented, for example with the aid of two-dimensional images fed into vehicle 2.

As already explained above, at least one of the at least one biometric feature of body part 4, i.e. hand 4, is designed as a biometric feature for biodetection, namely as a human pulse. For the purpose of detecting the human pulse, during the visual detection of hand 4, light was radiated with the aid of camera lighting apparatus 2.2.2 onto hand 4 in a wavelength range corresponding to infrared radiation, with the aid of which the human pulse of the user, i.e. his pulse rate, was ascertained. The design of the at least one biometric feature as a biometric feature for biodetection thus offers an effective protection against access to vehicle 2 by unauthorized persons.

The user may now open driver's door 2.4 of vehicle 2 by pulling on door handle 2.4.1 of driver's door 2.4 and enter vehicle 2.

The invention is not limited to the present exemplary embodiment of the vehicle according to the invention and the method according to the invention. For example, the vehicle does not necessarily have to be a motor vehicle designed as a passenger car.

Instead of a camera, a plurality of cameras are also conceivable, which interact in the manner according to the invention. For example, it could be provided that one of at least two cameras is designed and configured to visually detect the body part of the user in a first wavelength range, in particular in a first wavelength range corresponding to visible light, and the other of the at least two cameras is designed and configured to visually detect the body part of the user in a second wavelength range which is different from the first wavelength range, in particular in a second wavelength range corresponding to infrared radiation, and the controller is designed and configured to evaluate output signals of the at least two cameras corresponding thereto.

It would also be possible to arrange multiple cameras on different sides of the vehicle to thereby permit, for example, an unlocking of the vehicle doors from different sides of the vehicle.

A camera lighting apparatus is also not absolutely necessary. Moreover, the positioning assistance apparatus and/or the acknowledgment apparatus may also be designed as separate structural units. Correspondingly, it would be possible to position the positioning assistance apparatus and/or the acknowledgment apparatus on the vehicle spatially separate from the camera lighting apparatus. In addition, it is possibly thereby to provide the positioning assistance apparatus and/or the acknowledgment apparatus with a different design from the camera lighting apparatus. For example, the positioning assistance apparatus and/or the acknowledgment apparatus could be designed and configured to output an acoustic signal or an acoustic and optical signal.

The at least one camera does not absolutely have to be disposed on an external rear-view mirror. For example, it is conceivable that the at least one camera is alternatively or additionally disposed on an internal rear-view mirror of the vehicle. Disposing the camera on the internal rear-view mirror is useful, for example, if a vehicle component designed as a starting unit for starting the drive of the vehicle is to be enabled with the aid of the camera for the visual detection of a body part of a user of the vehicle. In particular, a camera of this type may be simultaneously designed and configured as another vehicle function for monitoring the user state, and the controller may be designed and configured to evaluate output signals of this camera corresponding thereto. However, a combination of the aforementioned embodiments is also conceivable with the embodiment explained on the basis of the exemplary embodiment.

An advantageous application of the invention is, however, not limited to an access system and/or a starting unit for a vehicle. Other vehicle components, and thus also other vehicle functions, may alternatively or additionally be taken into account in further embodiments of the invention.

Another advantageous refinement of the vehicle according to the invention provides that one of the at least one camera is designed and configured as a camera for monitoring the user state, and the controller is designed and configured to evaluate output signals of the at least one camera corresponding thereto. As another vehicle function, for example, the degree of attention on the part of the user, for example of the vehicle driver of the vehicle, may be monitored in a manner known to those skilled in the art with the aid of the user state monitoring function. However, this is purely by way of example. The user state monitoring function may also be used for the vehicle function as an alternative or in addition to the further vehicle function. For example, fatigue, the influence of drugs or alcohol or another psychological or physical disorder could result in the user no longer being able to drive the vehicle in traffic. Correspondingly, the performance of the vehicle function, for example a starting of the drive motor of the vehicle, could be blocked based on the user state monitoring function for example the monitoring of the eyelid movement of the eyes.

As an alternative or in addition to the design of at least one biometric feature for biodetection as a human pulse, it is conceivable that at least one of the at least one biometric feature is designed as a three-dimensional contour of an outer or an inner surface of the body part, light having a predefined pattern being projectable onto the body part with the aid of the camera lighting apparatus. As an alternative or in addition to the detection of the human pulse for biodetection, a protection against an unauthorized performance of the vehicle function with the aid of a two-dimensional image fed into the vehicle is technically easily implemented hereby. The light with the predefined pattern may be emitted in a wavelength range corresponding to visible light, namely to detect a contour of an outer surface of the body part, as well as in a wavelength range corresponding to infrared radiation, namely to detect a contour of an inner surface of the body part. An outer surface may be, for example the skin surface of the hand of the user; an inner surface may be, for example, the surface of blood vessels running in the hand of the user or the like. The light may be designed, for example, as a stripe light pattern. However, other patterns are also possible. Reference is hereby made to a dot pattern purely by way of example. Based on the three-dimensionality of a contour of an outer or an inner surface of the body part, an undesirable manipulation with the aid of a two-dimensional image is effectively prevented.

In another embodiment of the vehicle according to the invention, it is conceivable that the camera and the controller are designed and configured to generate and/or store a shared signature in the camera and in the controller, the shared signature being able to be entered into a recorded image with the aid of the camera, and this recorded image with the shared signature being identifiable as an image recorded by the camera with the aid of the controller, based on the shared signature. The security against an unauthorized performance of the vehicle function is further improved in this way. The shared signature may be, for example, a time stamp synchronized between the camera and the controller or at least one light flash synchronized between the camera and the controller. The same applies to another embodiment of the method according to the invention, whereby a shared signature is generated and/or stored in the camera and in the controller, and the camera enters the shared signature into an image recorded with the aid of the camera, this recorded image with the shared signature being identified as an image recorded by the camera with the aid of the controller, based on the shared signature.

Another refinement of the method according to the invention provides that the camera is designed and configured for visual detection, and the controller is designed and configured to evaluate a movement of the body part. The security against an unauthorized execution of the vehicle function is additionally improved hereby in a particularly simple technical manner. The same applies to a refinement of the method according to the invention corresponding thereto, whereby a movement of the body part is visually detected with the aid of the camera and evaluated with the aid of the controller.

As an alternative or in addition to the positioning assistance apparatus and the acknowledgment apparatus, it is possible in the exemplary embodiment explained above that the camera may be automatically transferred, with the aid of a camera drive apparatus, from a first camera orientation optimized for carrying out the further vehicle function to a second camera orientation optimized for performing the vehicle function, depending on the triggering signal. This makes it possible to optimally orient the camera for carrying out the further vehicle function, on the one hand, and for performing the vehicle function, on the other hand. Quality losses due to a compromise in the orientation of the camera are effectively prevented thereby. The same applies to a refinement of the method according to the invention corresponding thereto, whereby the camera is automatically transferred, with the aid of a camera drive apparatus, from a first camera orientation optimized for carrying out the further vehicle function to a second camera orientation optimized for performing the vehicle function, depending on the triggering signal.

For example, it is conceivable that the first camera orientation and the second camera orientation are predefined and stored in the controller for driving the camera drive apparatus. The automatic camera orientation is very easily technically implemented hereby. Alternatively thereto, however, it is also possible that the first camera orientation is predefined and stored in the controller for driving the camera drive apparatus, and the second camera orientation is automatically settable with the aid of the camera drive apparatus for performing the vehicle function, depending on the images of the body part detected with the aid of the camera. In this way, the second camera orientation is provided with a variable design for performing the vehicle function, so that the quality is improved during the visual detection of the body part. The same applies to the refinement of the method according to the invention corresponding thereto, whereby the first camera orientation is predefined and stored in the controller for driving the camera drive apparatus, and the second camera orientation is automatically set with the aid of the camera drive apparatus for performing the vehicle function, depending on the images of the body part detected with the aid of the camera.

Moreover, embodiments of the invention are possible, in which the vehicle component is additionally drivable with the aid of a portable remote control for performing the vehicle function, the remote control being automatically transferable back and forth between an activation state, in which the vehicle component is drivable with the aid of the remote control, and a deactivation state, in which the vehicle component is not drivable with the aid of the remote control, depending on a driving of the vehicle component with the aid of the camera. Accordingly a refinement of the method according to the invention corresponding thereto provides that the vehicle component is additionally drivable with the aid of a portable remote control for performing the vehicle function, the remote control being automatically transferred back and forth between an activation state, in which the vehicle component is drivable with the aid of the remote control, and a deactivation state, in which the vehicle component is not drivable with the aid of the remote control, depending on a driving of the vehicle component with the aid of the camera. This makes it possible to operate the vehicle component for performing the vehicle function, in principle, with the aid of a remote control, which is known per se, on the one hand, and depending on the visual detection of the body part, on the other hand. According to this refinement, it is possible, for example, to leave the remote control in the vehicle during an excursion to a bathing lake. A central locking system of the vehicle, i.e. an access system of the vehicle, could be locked with the aid of the visual detection upon leaving the vehicle. In addition, the remote control remaining in the vehicle could be automatically transferred to its deactivation state. The vehicle could thus not be operated with the aid of the remote control and therefor not be either opened or started. When the user returns to the vehicle from the lake, he may unlock the central locking system again with the aid of the visual detection and simultaneously transfer the remote control to its activation state. Accordingly, the vehicle could then be locked, unlocked and/or started in the usual manner with the aid of the remote control.

A keyless access to a vehicle may thus be easily implemented in terms of structure and circuitry with the aid of the invention. The same applies to other vehicle components and vehicle functions corresponding thereto. In addition, costs are reduced and installation space is saved. The largely multiple use of the components according to the invention, for example the camera and the controller, is crucial hereto. A consistent multiple use of the remaining components, as explained by way of example on the basis of the exemplary embodiment, additionally increases the advantages of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A vehicle comprising:
    a vehicle component to perform a vehicle function;
    at least one camera for visually detecting a body part of a user of the vehicle; and
    a controller for driving the at least one camera for evaluating output signals of the at least one camera and for driving the vehicle component, the vehicle component and the at least one camera being connected to the controller in a signal-transmitting manner, and the vehicle component being drivable with the aid of the controller for performing the vehicle function depending on the evaluation of the output signals of the at least one camera, the output signals corresponding to the visual detection of the body part, wherein the at least one camera and the controller are designed and configured to carry out a further vehicle function, wherein the at least one camera is drivable with the aid of the controller depending on a triggering signal present at the controller for performing the visual detection of the body part of the user, and wherein the at least one camera and the controller are designed and configured to generate and/or store a shared signature in the at least one camera and in the controller, the shared signature being able to be entered into a recorded image with the aid of the at least one camera, and the recorded image with the shared signature being identifiable as an image recorded by the at least one camera with the aid of the controller, based on the shared signature.

2. The vehicle according to claim 1, wherein the at least one camera visually detects at least one biometric feature of the body part, and wherein the controller is configured to evaluate output signals of the at least one camera corresponding to the at least one biometric feature of the body part.

3. The vehicle according to claim 2, wherein the at least one biometric feature of the body part is designed as a biometric feature for biodetection.

4. The vehicle according to claim 3, wherein the biometric feature for biodetection is a human pulse.

5. The vehicle according to claim 4, wherein light in a wavelength range corresponding to infrared radiation may be emitted with the aid of a camera lighting apparatus for the purpose of detecting the human pulse.

6. The vehicle according to claim 2, wherein one of the at least one biometric feature is a three-dimensional contour of an outer or an inner surface of the body part, wherein light having a predefined pattern being projectable onto the body part with the aid of a camera lighting apparatus.

7. The vehicle according to claim 1, wherein the triggering signal may be generated depending on a proximity sensor for detecting an approach of the user to the at least one camera.

8. The vehicle according to claim 1, wherein the at least one camera is configured to visually detect the body part of the user in a first wavelength range and a second wavelength range which are separate from each other, or wherein the at least one camera includes at least two cameras and one of the at least two cameras is configured to visually detect the body part of the user in the first wavelength range, and the other of the at least two cameras is configured to visually detect the body part of the user in the second wavelength range, which is different from the first wavelength range, and the controller is configured to evaluate output signals of the at least one camera or the at least two cameras.

9. The vehicle according to claim 8, wherein the at least one camera is designed and configured to visually detect the body part of the user in the first wavelength range corresponding to visible light and in the second wavelength range corresponding to infrared radiation, or the one of the at least two cameras is designed and configured to visually detect the body part of the user in the first wavelength range corresponding to visible light, and the other of the at least two cameras is designed and configured to visually detect the body part of the user in the second wavelength range corresponding to infrared radiation, and the controller is designed and configured to evaluate output signals of the at least one camera or the at least two cameras.

10. The vehicle according to claim 1, wherein a camera lighting apparatus of the vehicle is assigned to the at least one camera, a wavelength range of light emitted by the camera lighting apparatus being designed to be matched to a wavelength range of the at least one camera corresponding thereto, and the camera lighting apparatus being drivable for emitting light depending on an operating state of the at least one camera with the aid of the controller.

11. The vehicle according to claim 1, wherein the vehicle includes a positioning assistance apparatus for positioning the body part of the user for the purpose of visual detection of the body part with the aid of the at least one camera, the positioning assistance apparatus being drivable, with the aid of the controller, depending on an operating state of the at least one camera, and for outputting a positioning assistance signal is optically and/or acoustically perceivable by the user.

12. The vehicle according to claim 1, wherein the vehicle includes an acknowledgment apparatus for acknowledging the visual detection of the body part of the user with the aid of the at least one camera, the acknowledgment apparatus being drivable with the aid of the controller, depending on a proper visual detection of the body part of the user, and for outputting an acknowledgment signal which is optically and/or acoustically perceivable by the user.

13. The vehicle according to claim 1, wherein the at least one camera is disposed on an external rear-view mirror and/or on an internal rear-view mirror of the vehicle.

14. The vehicle according to claim 1, wherein the at least one camera is designed as a camera having a wide-angle lens having a field of vision greater than or equal to 180°, and the controller is designed and configured to evaluate output signals of the at least one camera corresponding thereto.

15. The vehicle according to claim 1, wherein the at least one camera is designed and configured as a camera for monitoring a user state, and the controller is designed and configured to evaluate output signals of the at least one camera corresponding thereto.

16. The vehicle according to claim 1, wherein the at least one camera is designed and configured for visual detection, and the controller is designed and configured to evaluate a movement of the body part.

17. The vehicle according to claim 1, wherein the at least one camera is automatically transferable, with the aid of a camera drive apparatus, from a first camera orientation optimized for carrying out the further vehicle function to a second camera orientation optimized for performing the vehicle function, depending on the triggering signal.

18. The vehicle according to claim 17, wherein the first camera orientation and the second camera orientation are predefined and stored in the controller for driving the camera drive apparatus.

19. The vehicle according to claim 17, wherein the first camera orientation is predefined and stored in the controller for driving the camera drive apparatus, and the second camera orientation is automatically settable with the aid of the camera drive apparatus for performing the vehicle function, depending on images of the body part detected with the aid of the at least one camera.

20. A vehicle comprising:
a vehicle component to perform a vehicle function;
at least one camera for visually detecting a body part of a user of the vehicle; and
a controller for driving the at least one camera for evaluating output signals of the at least one camera and for driving the vehicle component, the vehicle component and the at least one camera being connected to the controller in a signal-transmitting manner, and the vehicle component being drivable with the aid of the controller for performing the vehicle function depending on the evaluation of the output signals of the at least one camera, the output signals corresponding to the visual detection of the body part, wherein the at least one camera and the controller are designed and configured to carry out a further vehicle function, wherein the at least one camera is drivable with the aid of the controller depending on a triggering signal present at the controller for performing the visual detection of the body part of the user, and wherein the vehicle component is additionally drivable with the aid of a portable remote control for performing the vehicle function, the remote control being automatically transferable back and forth between an activation state, in which the vehicle component is drivable with the aid of the remote control, and a deactivation state, in which the vehicle component is not drivable with the aid of the remote control, depending on a driving of the vehicle component with the aid of the at least one camera.

21. A method for operating a vehicle, the method comprising:

providing a vehicle component for performing a vehicle function;

providing at least one camera for visually detecting a body part of a user of the vehicle; and providing a controller for driving the at least one camera for evaluating output signals of the at least one camera and for driving the vehicle component;

connecting the vehicle component and the at least one camera to the controller in a signal-transmitting manner; and driving the vehicle component via the controller for performing the vehicle function depending on the evaluation of the output signals corresponding to the visual detection of the body part with the aid of the at least one camera, wherein the at least one camera and the controller are designed and configured to carry out a further vehicle function, wherein the controller drives the at least one camera depending on a triggering signal present at the controller for performing the visual detection of the body part of the user, and wherein a shared signature is generated and/or stored in the at least one camera and in the controller, and the at least one camera enters the shared signature into a recorded image with the aid of the at least one camera, the recorded image with the shared signature being identified as an image recorded by the at least one camera, based on the shared signature.

22. The method according to claim 21, wherein at least one biometric feature of the body part is visually detected and evaluated with the aid of the at least one camera and the controller.

23. The method according to claim 22, wherein the at least one biometric feature of the body part is designed as a biometric feature for biodetection.

24. The method according to claim 23, wherein the biometric feature for biodetection is a human pulse.

25. The method according to claim 24, wherein light is emitted in a wavelength range corresponding to infrared radiation with the aid of a camera lighting apparatus for the purpose of detecting the human pulse.

26. The method according to claim 22, wherein one of the at least one biometric feature is designed as a three-dimensional contour of an outer or an inner surface of the body part, wherein light having a predefined pattern being projected onto the body part with the aid of a camera lighting apparatus.

27. The method according to claim 21, wherein the triggering signal is generated depending on a proximity sensor for detecting a approach of the user to the at least one camera.

28. The method according to claim 21, wherein a camera lighting apparatus of the vehicle is assigned to the at least one camera, a wavelength range of light emitted by the camera lighting apparatus being designed to be matched to a wavelength range of the at least one camera corresponding thereto, and the controller driving the camera lighting apparatus for emitting light, depending on an operating state of the at least one camera.

29. The method according to claim 21, wherein the vehicle includes a positioning assistance apparatus for positioning the body part of the user for the purpose of visual detection of the body part with the aid of the at least one camera, the controller driving the positioning assistance apparatus depending on an operating state of the at least one camera for outputting a positioning assistance signal, which is optically and/or acoustically perceivable by the user.

30. The method according to claim 21, wherein the vehicle includes an acknowledgment apparatus for acknowledging the visual detection of the body part of the user with the aid of the at least one camera, the controller driving the acknowledgment apparatus depending on a proper visual detection of the body part of the user with the aid of the at least one camera for outputting an acknowledgment signal, which is optically and/or acoustically perceivable by the user.

31. The method according to claim 21, wherein a movement of the body part is visually detected with the aid of the at least one camera and evaluated with the aid of the controller.

32. The method according to claim 21, wherein the at least one camera is automatically transferred from a first camera orientation optimized for carrying out the further vehicle function into a second camera orientation optimized for performing the vehicle function with the aid of a camera drive apparatus, depending on the triggering signal.

33. The method according to claim 32, wherein the first camera orientation and the second camera orientation are predefined and stored in the controller for driving the camera drive apparatus.

34. The method according to claim 32, wherein the first camera orientation is predefined and stored in the controller for driving the camera drive apparatus, and the second camera orientation is automatically set with the aid of the camera drive apparatus for performing the vehicle function, depending on images of the body part detected with the aid of the at least one camera.

35. The method according to claim 21, wherein the vehicle component is additionally drivable with the aid of a portable remote control for performing the vehicle function, the remote control being automatically transferred back and forth between an activation state, in which the vehicle component is drivable with the aid of the remote control, and a deactivation state, in which the vehicle component is not drivable with the aid of the remote control, depending on a driving of the vehicle component with the aid of the at least one camera.

\* \* \* \* \*